July 25, 1950

W. T. POWELL 2,516,645

ALL-RELAY AUTOMATIC AND MANUAL TELEPHONE SYSTEM HAVING BUTT-IN AND ALARM FEATURES

Filed Feb. 12, 1947

7 Sheets-Sheet 1

INVENTOR.
WINFRED T. POWELL

BY T. L. Bowes

ATTORNEY

July 25, 1950 W. T. POWELL 2,516,645

ALL-RELAY AUTOMATIC AND MANUAL TELEPHONE SYSTEM HAVING BUTT-IN AND ALARM FEATURES

Filed Feb. 12, 1947 7 Sheets-Sheet 2

INVENTOR.
WINFRED T. POWELL

BY T. L. Bowes

ATTORNEY

July 25, 1950 W. T. POWELL 2,516,645

ALL-RELAY AUTOMATIC AND MANUAL TELEPHONE SYSTEM HAVING BUTT-IN AND ALARM FEATURES

Filed Feb. 12, 1947 7 Sheets-Sheet 3

INVENTOR.
WINFRED T. POWELL

BY T. L. Bowes

ATTORNEY

July 25, 1950 | W. T. POWELL | 2,516,645

ALL-RELAY AUTOMATIC AND MANUAL TELEPHONE SYSTEM HAVING BUTT-IN AND ALARM FEATURES

Filed Feb. 12, 1947 | 7 Sheets-Sheet 4

INVENTOR.
WINFRED T. POWELL

BY T. L. Bowes

ATTORNEY

INVENTOR.
WINFRED T. POWELL

BY T. L. Bowes
ATTORNEY

INVENTOR.
WINFRED T. POWELL
BY T. L. Bowes
ATTORNEY

INVENTOR.
WINFRED T. POWELL
BY T. L. Bowes
ATTORNEY

Patented July 25, 1950

2,516,645

UNITED STATES PATENT OFFICE 2,516,645

ALL-RELAY AUTOMATIC AND MANUAL TELEPHONE SYSTEM HAVING BUTT-IN AND ALARM FEATURES

Winfred T. Powell, Rochester, N. Y., assignor to Stromberg-Carlson Company, a corporation of New York Application February 12, 1947, Serial No. 728,004

5 Claims. (Cl. 179—27)

This invention relates to multi-office telephone systems in general, but is concerned more particularly with such systems including both automatic and manual exchanges and employing composite (CX) trunks between exchanges.

The invention has for its broad object the provision of new and improved circuits for effecting the toll offering, delayed toll ring and alarm signal controls from either of two automatic exchanges connected in tandem to a manual exchange.

Figure 1A:
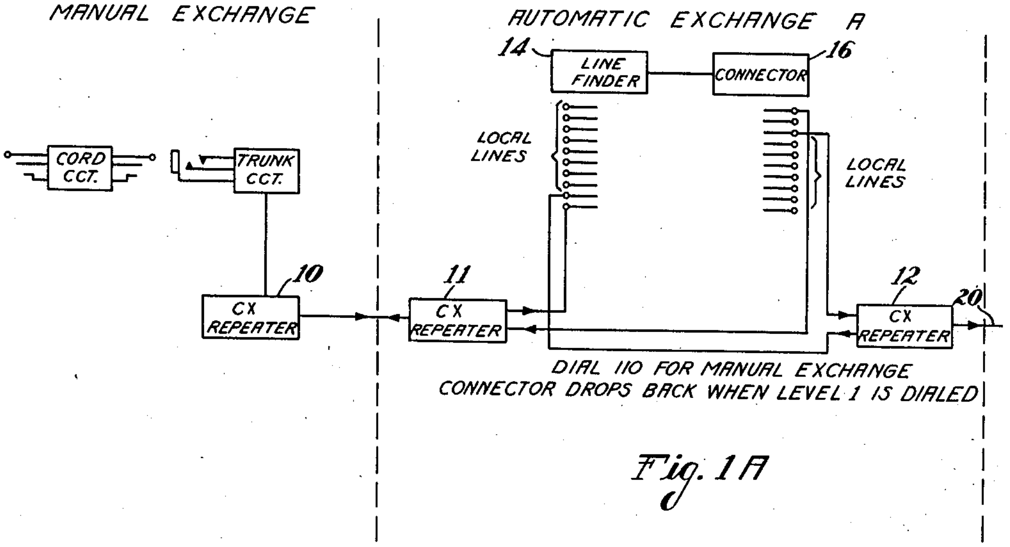
Figure 1B:
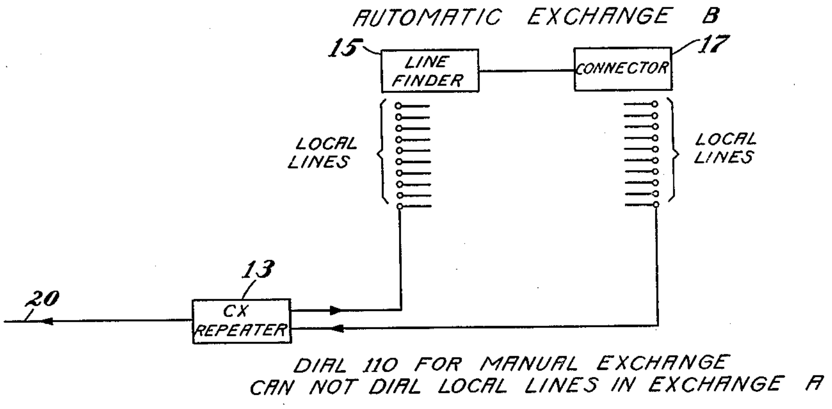

Acording to one feature of the invention, composite or CX repeaters terminate the two-way interoffice trunks between the manual exchange and automatic exchange A, as well as the two-way interoffice trunks between the two automatic exchanges A and B, as indicated in Figs 1A and 1B of the drawings, with the circuit so arranged that an alarm indication in either exchange A or exchange B will be transmitted over the fourth dial leg of the composite set to the manual exchange.

Another feature of the invention lies in the novel toll offering arrangement, which includes a new and improved means for controlling the toll offering operation of the connector, by way of the same above mentioned fourth dial leg, when the connector is operated from the distant manual office, with the toll offering feature being rendered ineffective on local calls.

Stil another feature of the invention resides in the novel circuit arrangement for providing delayed toll ring, whereby the toll operator may dial the line number, seize the line, hold it and then dial the last or station digit when she is ready to complete the call.

The above and other features of the invention will be more clearly understood from a perusal of the following specification when read in connection with the accompanying drawings, comprising Figs. 1 to 7, inclusive which show by means of the usual schematic diagrams sufficient portions of a multi-office telephone system to enable the present invention to be understood.

Figs. 1A and 1B show a trunking layout of the telephone system, including a manual exchange and two automatic exchanges A and B. The manual exchange is indicated at the left of the drawing and comprises an operator's cord circuit, a trunk circuit and a CX repeated circuit 10. It will be understood that the trunk circuit and the CX repeater circuit may be combined into one unit. Repeater 10 forms the manual end of a two-way trunk extending to the first automatic exchange A, there being a plurality of such trunks. Automatic exchanges A and B are four-digit exchanges, preferably of the all relay type and include line finders, such as 14 and connectors, such as 16. The two-way trunks from the manual exchange terminate at exchange A in CX repeaters, such as 11 and line circuits terminating in line finders, such as 14, as indicated. These trunks are accessible to connectors, such as 16, from the 0 level. Automatic exchanges A and B are interconnected by two-way trunks terminating at exchange A in CX repeaters, such as 12 and terminating in line circuits selected by line finders, such as 14, as indicated. The two-way trunk repeaters, such as 12, are selected for calls from exchange A to exchange B from the 8 level. These two-way trunks terminate at exchange B in CX repeaters, such as 13 and they terminate in line circuits accessible to line finders, such as 15, as indicated. These two-way trunks are selected in exchange B from the 1 level of the connectors, such as 17. Repeaters 11, 12 and 13 are identical, but repeater 10 is of the type which functions when selected by the operator in the manual exchange instead of being selectable from a connector in an automatic exchange.

Figure 2A:
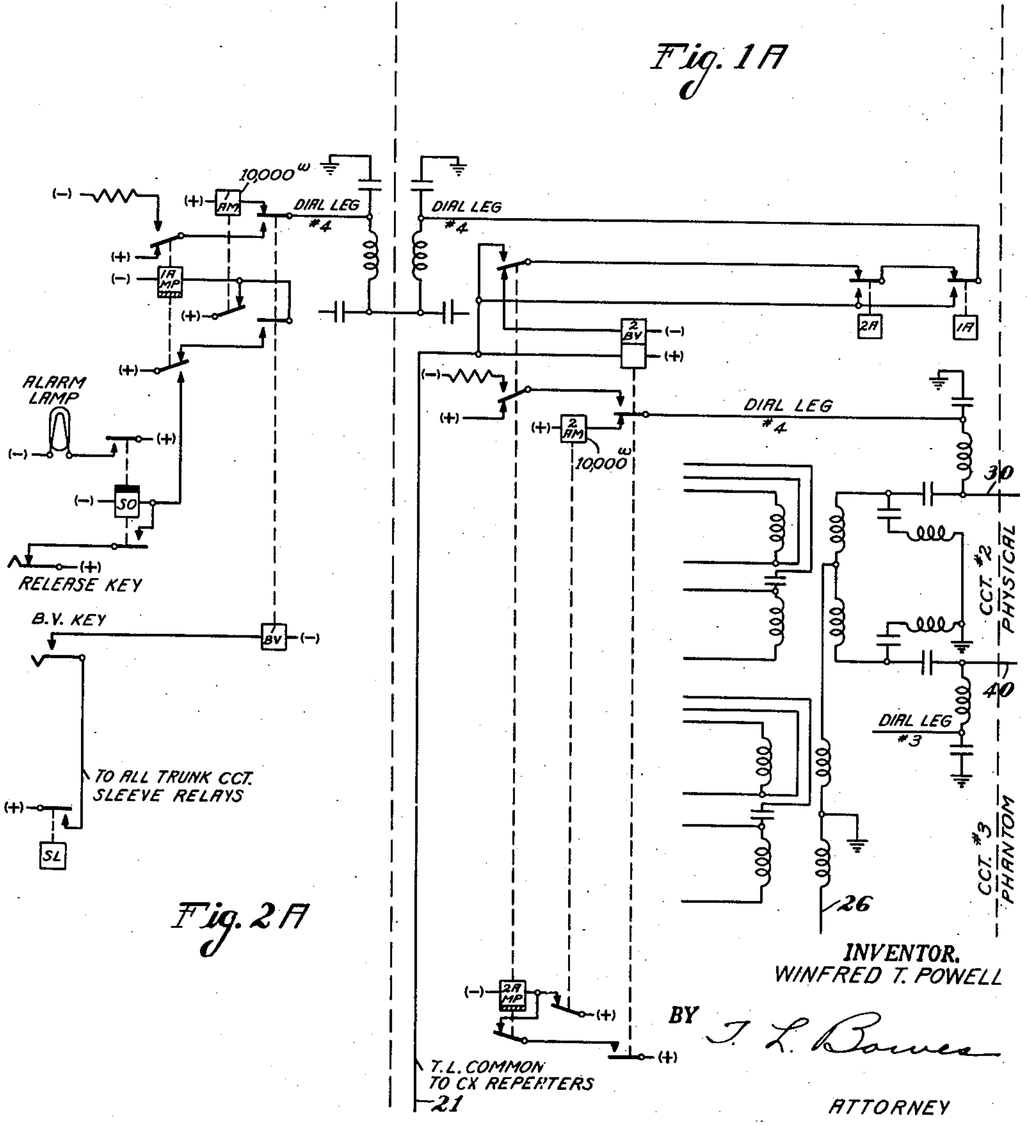
Figure 2B:
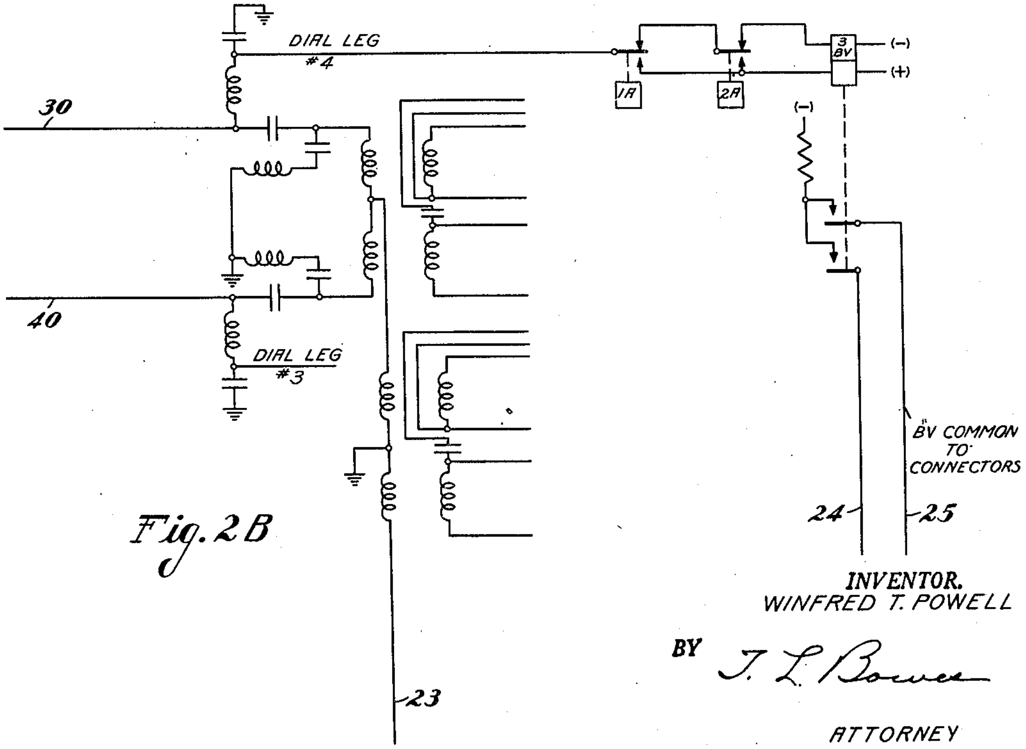

Figs. 2A and 2B disclose the circuit arrangement of the fourth dial legs between the offices, whereby the toll offering, delayed ring and alarm control functions are provided. The circuit of Figs. 2A and 2B tie in with the other circuits as indicated by the wires leading off the bottom and connecting to correspondingly identified wires at the top of Figs. 3 and 4.

Figure 3:
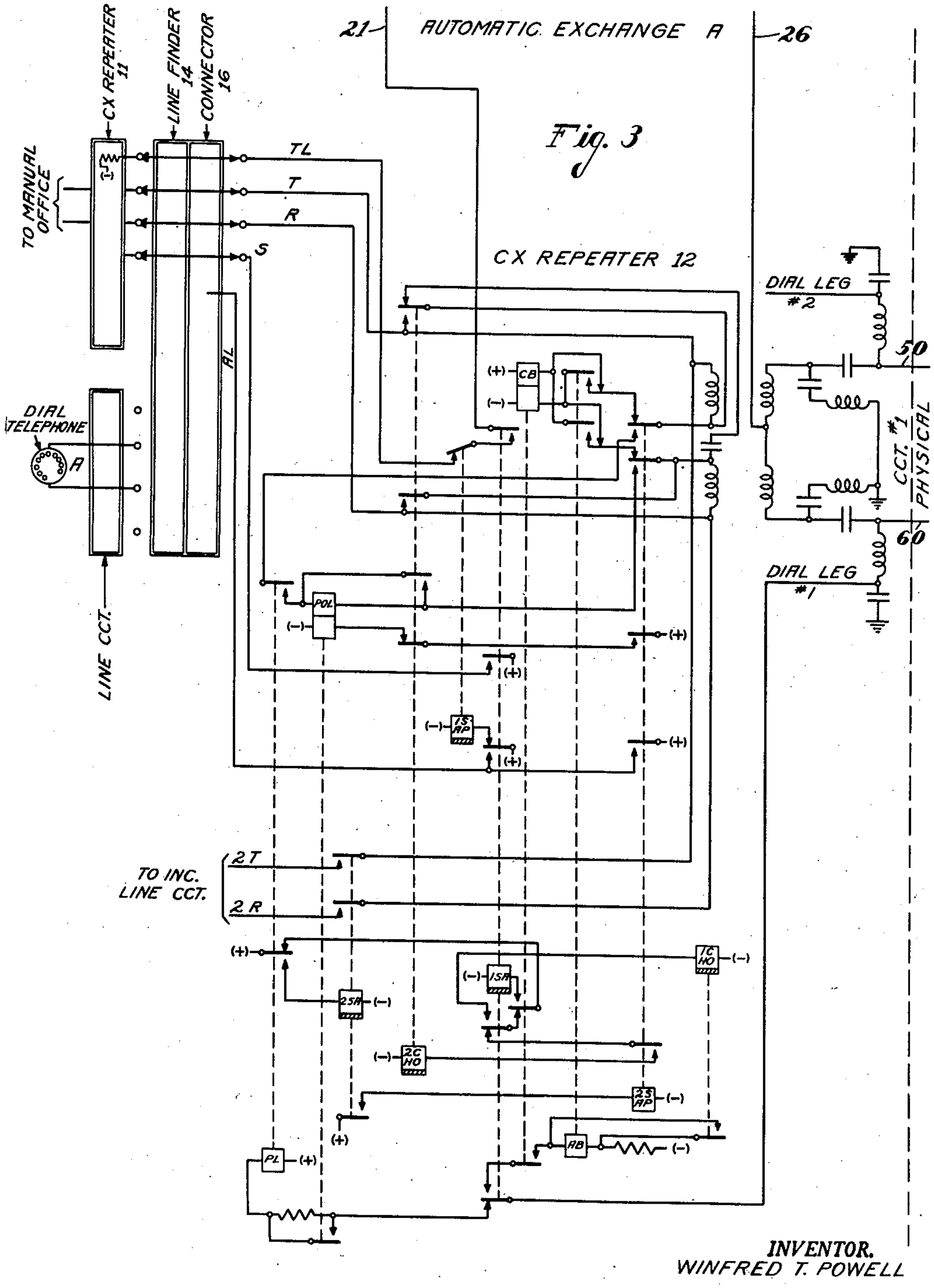

Fig. 3 discloses the CX trunk or repeater circuit, such as 12 in exchange A.

Figure 4:
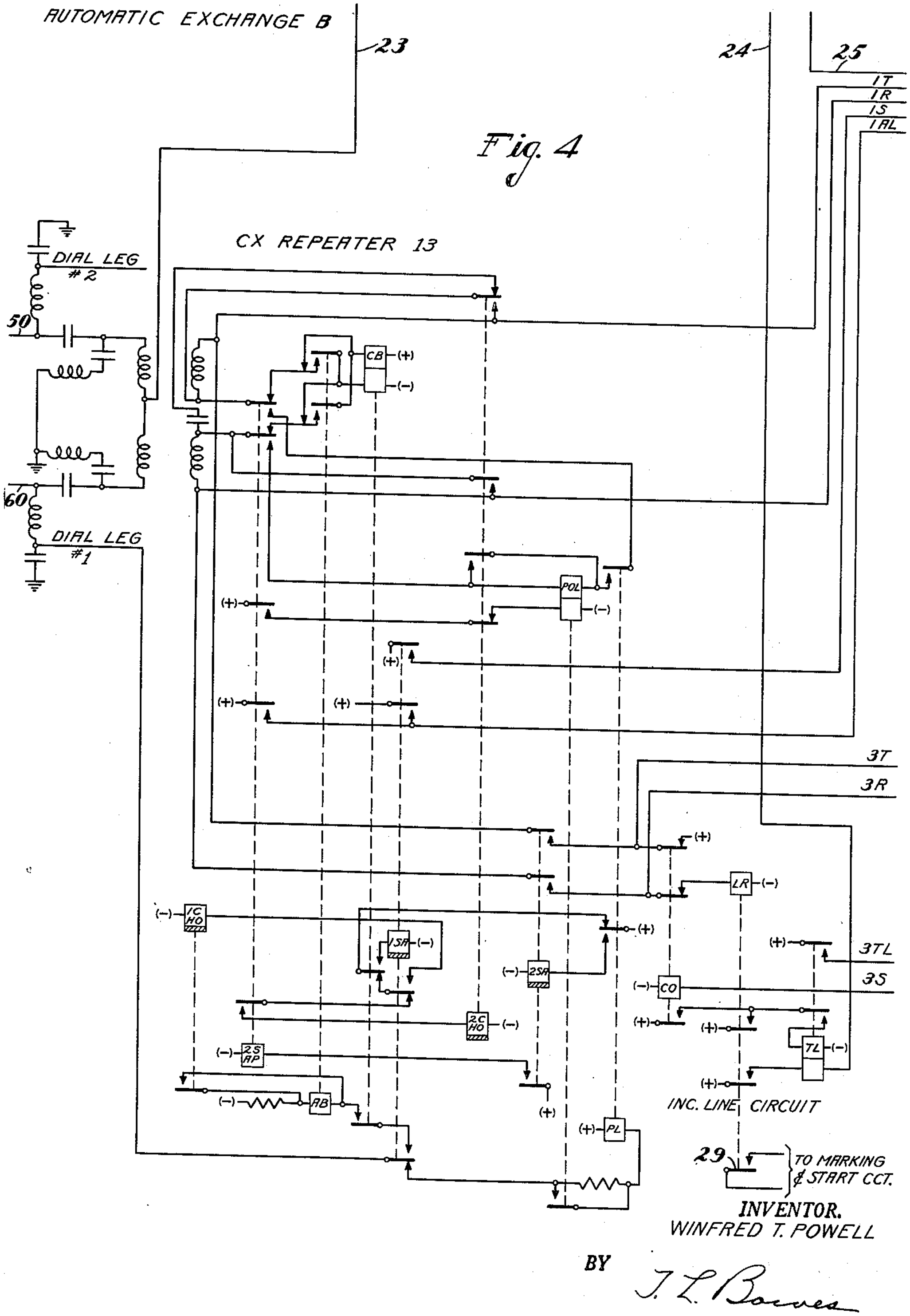

Fig. 4 discloses the CX trunk or repeater circuit, such as 13 in exchange B. It will be observed that the circuits of Figs. 3 and 4 are identical, but are shown in reverse order to facilitate in the description.

Figure 5:
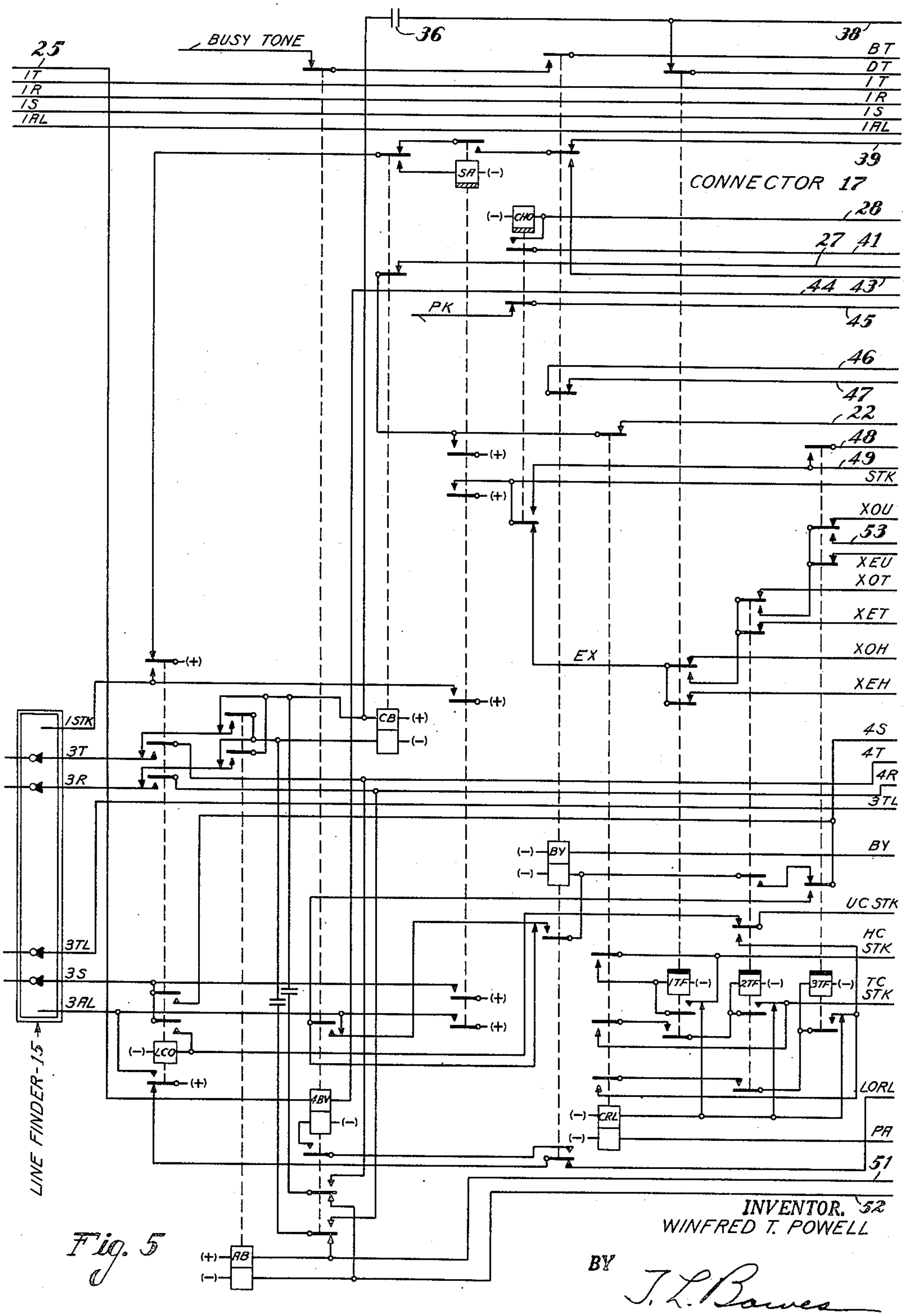
Figure 6:
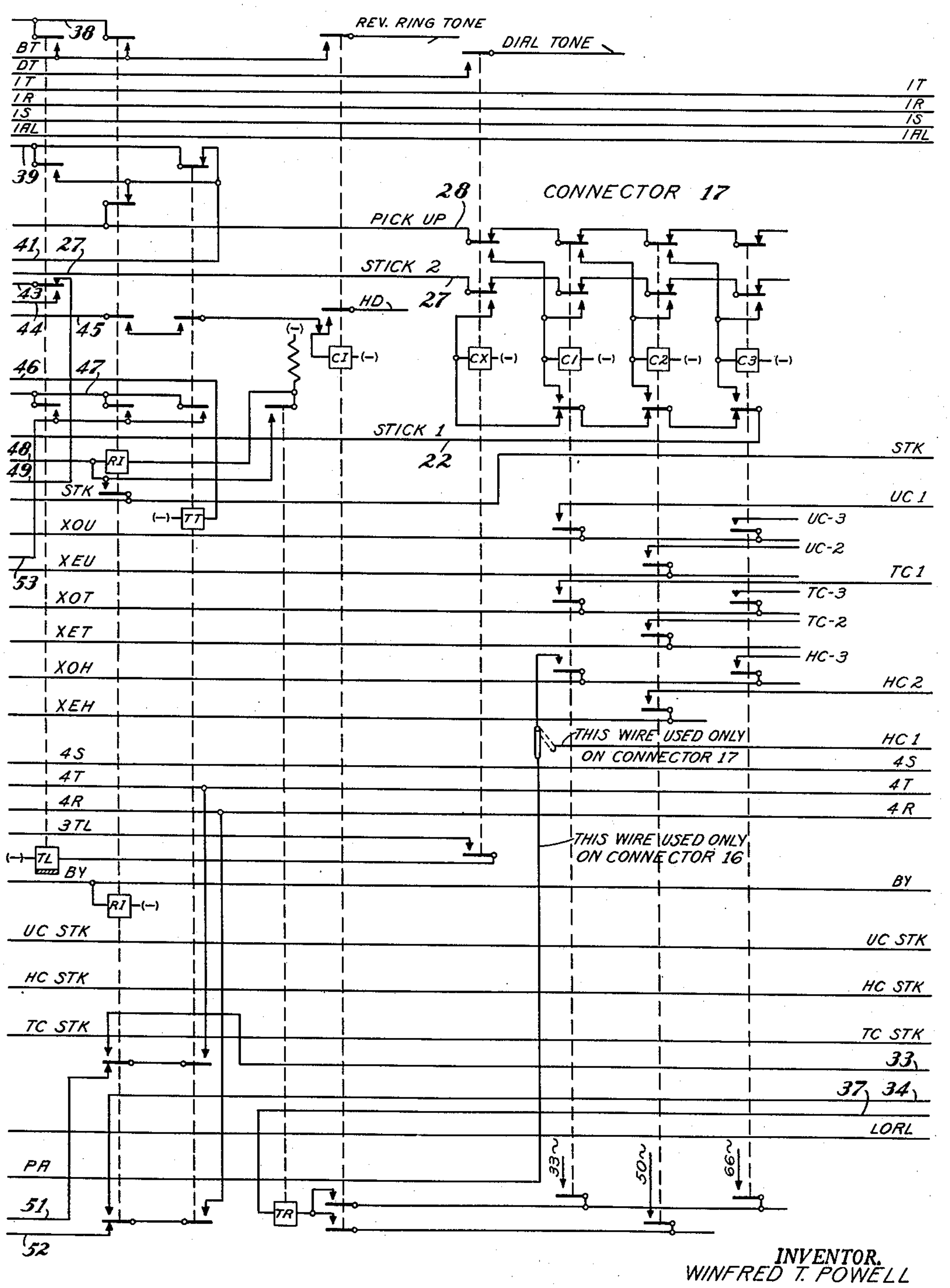
Figure 7:
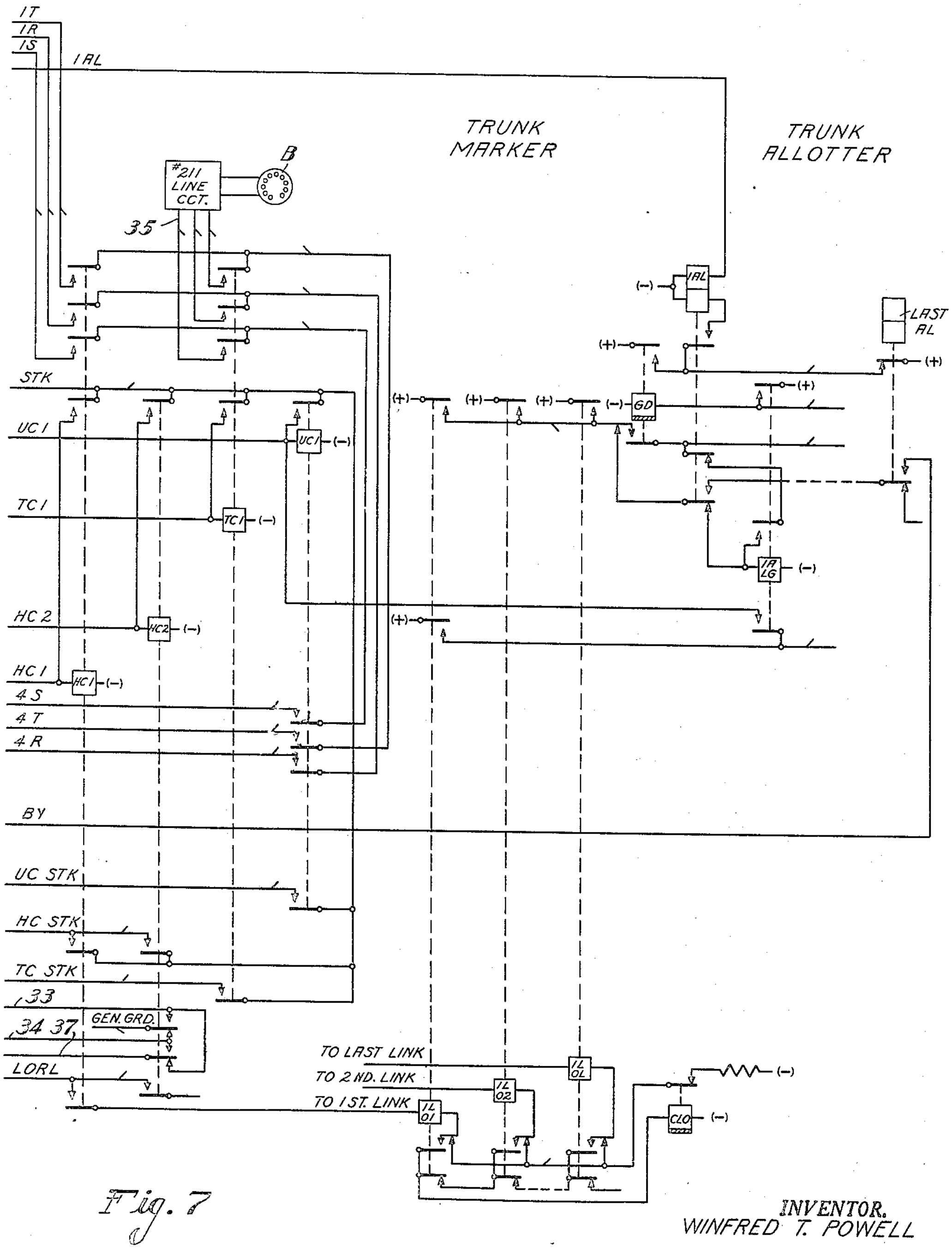

Figs. 5, 6 and 7 disclose a connector circuit, such as 16 and 17, and a line circuit, such as the line circuit which terminates the trunk associated with repeater 13.

Referring to the trunk layout shown in Figs. 1A and 1B, a brief general description will first be given of the manner in which the various connections are established in the multi-office system. Assuming first that the operator at the manual exchange has received a request for a connection with a subscriber in automatic exchange A. The operator inserts the calling end of the cord circuit into the jack associated with the trunk circuit extending to exchange A.

When the plug of the cord is inserted in the jack, the CX repeater 10 operates to close a circuit over the #1 dial leg (for example) of the composite set for operating repeater 11 in automatic exchange A. This operation of repeater 11 operates the associated incoming line circuit for causing a line finder, such as 14, to connect to repeater 11, thus extending the connection from the operator's cord circuit to connector 16.

The operator now proceeds to dial either the telephone number of a local substation in exchange A or to dial #8 for extending the connection to exchange B. Assuming first that a local station in exchange A is desired, the operation of the dial at the manual position causes repeater 10 to transmit impulses to the connector for selecting the local line. In case the called line is idle the connector 16 rings automatically and when the called subscriber answers the connector reverses the battery back to repeater 11. Responsive to this reversal of current, repeater 11 conditions the #1 dial leg extending back to repeater 10 for giving answering supervision. The trunk circuit in the manual office is operated to extinguish the supervisory lamp at the operator's position to inform the operator that the called party has answered.

At the end of the conversation, when the called subscriber hangs up the receiver, the battery connection at connector 16 is restored to normal. This causes repeater 11 to condition the #1 dial leg extending back to repeater 10 for operating the trunk circuit to again light the supervisory lamp to show that the called subscriber has disconnected. When the operator removes the plug from the jack the trunk circuit, including repeater 10, conditions the #1 dial leg extending to repeater 11 and brings about the release of the connector 16 and the finder 14 from the line circuit associated with repeater 11, thus restoring the circuits to normal.

Assume now that a subscriber in automatic exchange A desires to talk with a subscriber who can be reached only through the manual exchange. When the subscriber at the substation in exchange A lifts the receiver a line finder, such as line finder 14, is operated to extend the calling line to a connector such as connector 16. The calling party now dials the digits 110, whereupon connector 16 is operated twice to the first level, being dropped back to normal after each digit #1 is dialed. Now when digit 0 is dialed, the tenth level is selected and an idle trunk extending to the manual exchange, such as the trunk associated with repeater 11, is connected with the calling line. When repeater 11 is seized, it transmits a calling signal by way of the #1 dial leg which is received by repeater 10 and causes the lighting of the calling lamp associated with this trunk circuit at the operator's position. Noting the lighted condition of the trunk lamp, the operator inserts the answering plug of a cord circuit into the associated jack thereby causing the trunk circuit to condition the #1 dial leg for operating a relay in repeater 11 which reverses the battery to the calling line to perform a metering function in case metered service is provided. The operator then completes the desired connection over the other end of the cord circuit. At the end of the conversation, when the calling party releases, repeater 11 conditions the #1 dial leg for causing repeater 10 to light the supervisory lamp at the operator's position. When the operator removes the plug from the trunk jack, the circuits in the manual exchange are restored to normal.

In the event of the manual operator receiving a call for a subscriber in automatic exchange B, she inserts the plug of a cord circuit into the jack associated with the trunk circuit and repeater 10, thereby causing the trunk circuit to condition the #1 dial leg, which in turn causes repeater 11 to mark this trunk circuit and to cause a line finder, such as line finder 14, to connect with the marked trunk circuit, thereby extending the connection to a connector, such as connector 16. To call a subscriber in exchange B, the manual operator dials digit 8 for selecting a trunk to exchange B, after which the number of the station in exchange B is dialed. Responsive to the operation of the dial in accordance with digit 8, the #1 dial leg of the trunk circuit extending between the manual exchange and exchange A is impulsed for stepping connector 16 to the eighth level. The connector automatically hunts in this level for an idle trunk extending to automatic exchange B by way of a repeater, such as 12. When repeater 12 is seized, it conditions the #1 dial leg (for example) of the two-way trunk extending between exchange A and exchange B for causing repeater 13 to mark this trunk in the line finder bank and for causing a line finder, such as line finder 15, to connect to repeater 13, thus extending the connection to connector 17. Responsive to the dialing of the remaining digits, repeater 10 transmits corresponding impulses over the #1 dial leg extending to exchange A, which are received by repeater 11 and retransmitted to repeater 12, whereby repeater 12 retransmits these impulses to repeater 13 in exchange B for operating connector 17 to extend the connection to the wanted station. The wanted station in exchange B is signalled automatically and when the subscriber answers, the reversal of battery in connector 17 causes repeater 13 to condition the #1 dial leg extending to repeater 12 for reversing the battery to repeater 11. This reverse battery is received by repeater 11 which in turn conditions the #1 dial leg for causing repeater 10 to transmit an answering supervisory signal to the manual exchange cord circuit to inform the operator that the called party has answered.

At the end of the conversation, when the subscriber at the substation in exchange B hangs up the receiver, the battery connections from connector 17 to repeater 13 are restored to normal and repeater 13 transmits a disconnect signal over the #1 dial leg to repeater 12 in exchange A. Repeater 12 responds to this signal and restores the battery connections to repeater 11 to normal. Repeater 11 responds to the battery connections being restored to normal and transmits a disconnect signal over the #1 dial leg which is received by repeater 10 and results in the lighting of the supervisory lamp to indicate to the operator that the called party has hung up the receiver. When the operator pulls out the plug a release signal is transmitted over the #1 dial leg to repeater 11 in exchange A. Responsive to this impulse, repeater 11 opens the loop extending through finder 14 and connector 16 to repeater 12, causing this latter repeater to transmit a signal over the #1 dial leg to exchange B. Repeater 13 responds to this signal to open the loop extending to the link comprising line finder 15 and connector 17 and thereby releases the link and restores repeater 13 in exchange B to normal.

A subscriber in exchange B desiring a connection with a subscriber in exchange A prefixes #1 to the number of the wanted station. The first digit 1 causes connector 17, for example, to select repeater 13 and extend the connection by way of repeater 12 and line finder 14 to connector 16. The remaining digits are effective to select the called station by way of connector 16.

A subscriber in exchange A desiring a connection with a subscriber in exchange B prefixes #8 to the number of the wanted station. The first digit 8 causes connector 16, for example, to select repeater 12 and extend the connection by way of repeater 13 and line finder 15 to connector 17. The remaining digits are effective to select the called station by way of connector 17.

It will be observed that, on a call from a subscriber in exchange B to the manual office, a connector, such as connector 16 is used, thus removing such connector from use by local lines in exchange A, and thereby reducing the trunking facilities for local calls in exchange A. It is possible to overcome this condition by making repeater 12 a selector repeater, with the arrow portion of this repeater pointing to the left going through a selector for selecting the repeaters, such as repeater 11, connected to the manual exchange, instead of having this arrow connection going to the line finder terminals as shown. In this case, a connector in office A is not tied up on a call from office B to the manual office. Furthermore, in this case, level 0 (instead of 110) would be used for calling the manual office from either office A or office B.

Referring to Figs. 2A and 2B the fourth dial leg of the composite set between the manual exchange and exchange A is tied in with the fourth dial leg of the composite set between exchange A and exchange B, this tie-in being by way of relays and not through any finder or connector link. As will be brought out in the detailed description, any repeater in exchange A and any connector in exchange B can cause the common circuit of Figs. 2A and 2B to operate to provide the toll offering, delayed toll ring and alarm control functions.

Having described the trunking layout of the exchanges in general and having described generally the various connections which can be established within the system, the operation of the circuits will now be explained in detail with reference to Figs. 2 to 7, inclusive. These figures should be laid out with Fig. 3 below Fig. 2A, with Fig. 4 below Fig. 2B and with Figs. 4, 5, 6 and 7 arranged in order to the right of Fig. 3. Since manual cord circuits, trunk circuits and repeater circuits (such as repeater 10) are well known and since no particular type of these circuits is required, they will not be shown or described, since they operate in any well known manner to cause repeater 11 (not shown) and line finder 14 (not shown) to repeat loop impulses to connector 16 for selecting repeater 12 or local lines in exchange A. Repeaters on both ends of a trunk circuit extending between exchange A and exchange B are shown, such as repeaters 12 and 13. A detailed description of the operation of these repeaters on a call from the operator in the manual exchange by way of connector 16 will be described, it being assumed that repeater 11 operates on a loop basis for extending the connection by way of line finder 14 to connector 16, after which connector 16 operates on a switch through basis when a trunk level is dialed.

For the purpose of simplifying the drawings and facilitating the explanation, various parts and circuits have been diagrammatically shown and certain conventional illustrations have been employed. The drawings have been made more with the purpose of making it easy to understand the principles and mode of operation, than with the idea of illustrating the specific construction and arrangement of parts and circuits that would be employed in practice. Thus, the various relays and their contacts are illustrated in a conventional manner, the use of symbols being employed to indicate the connections to the terminals of the batteries, or other sources of current, instead of showing all of the wire connections to these terminals. Relays shown with a lower cross hatch portion are slow release, while those with an upper heavy line portion are slow operate relays. The symbols (+) and (−) indicate the positive and negative terminals respectively of suitable batteries or other sources of direct current and the circuits with which these symbols are used always have current flowing in the same direction, that is, from (+) to (−). The relay contacts have been widely separated from the relay coils, with dashed lines extending between the coils and their associated contacts, in order to simplify the drawings.

Since the present invention is more particularly concerned with busy verification, delayed toll ringing and alarm control features in a tandem network, certain circuits will be omitted from the present disclosure, with the explanation being more particularly directed to the operation from a manual exchange in connection with two automatic exchanges, connected as illustrated in Fig. 1.

Assuming that the manual operator plugs into a jack associated with the trunk circuit and CX repeater 10 in the manual exchange, the circuits are controlled in any well known manner for conditioning CX repeater 11 in automatic exchange A to cause line finder 14 to find the line circuit associated with repeater 11 for extending the connection to connector 16. Connector 16, which may be the same as the connector illustrated in Figs. 5, 6 and 7 may then be operated to its eighth level for selecting CX repeater 12. From the description which follows, the operation of the relay type connector will be understood, since this connector operates in exactly the same manner as connector 17, illustrated in Figs. 5, 6 and 7.

When connector 16 selects and switches through to repeater 12, the closed circuit across the tip and ring conductors T and R of Fig. 3 operate calling bridge relay CB of repeater 12 over a circuit extending from (+), upper winding of relay CB, back contact of answering bridge relay AB, back contact of relay 2SAP, upper winding of the left-hand portion of the repeating coil, conductor T and thence through the connector and line finder circuits (16 and 14), through the closed circuit in repeater 11 (not shown), back through the line finder and connector circuits (14 and 16), conductor R, lower winding of the left-hand portion of the repeating coil, back contacts of relays 2SAP and AB and lower winding of relay CB to (−). Relay CB operates and closes a circuit for operating relay 1SA which extends from (+), back contact of pulse relay PL, make contact of relay CB and winding of slow-acting relay 1SA to (−). The operation of relay 1SA opens up the normally energized circuit of relay 1SAP, allowing this relay to release after a short time interval. Relays CB and 1SA close a circuit for energizing dial leg #1 extending from automatic exchange A to automatic exchange B, which circuit extends from (—), resistance, winding of relay AB, make contact of relay CB, make contact of relay 1SA, dial leg #1, conductor 60 extending to exchange B, dial leg #1, break contact of relay 1SA of CX repeater 13, resistor and winding of relay PL to (+). This operates relay PL, which in turn closes an obvious circuit for operating relay 2SA and this relay in turn closes an obvious circuit for operating relay 2SAP. The resistor in series with the winding of relay AB of repeater 12 is of such a value that relay AB does not operate over this circuit.

While relay 1SA of repeater 12 is operated and before relay 1SAP is released, a circuit is closed for operating busy verification relay 2BV of Fig. 2A, which circuit extends from (+), lower winding of relay 2BV, conductor 21, make contact of relay 1SA, make contact of relay 1SAP, conductor TL, through connector 16 and line finder 14 to (—) by way of the resistor associated with repeater 11. The operation of relay 2BV switches dial leg #4 from (+) through the high resistance winding of alarm relay 2AM to direct (+) through a normally closed make contact of relay 2AMP. This circuit is opened when relay 2BV is released by the release of relay 1SAP for again energizing dial leg #4 through high resistance relay 2AM. The purpose of this pulse applied to dial leg #4 will be explained later.

Returning now to the energization of relay 2SAP of repeater 13, the line circuit relay LR of the incoming line circuit in exchange B is operated over a circuit extending from (+), break contact of cut-off relay CO of this line circuit, make contact of relay 2SA, upper winding of the right-hand portion of the repeat coil, make contact of relay 2SAP, make contact of relay PL, upper winding of polar relay POL, make contact of relay 2SAP, lower winding of the right-hand portion of the repeat coil, make contact of relay 2SA, break contact of relay CO, and winding of relay LR to (—). Relay LR closes its contact 29 for marking this line circuit to be found by line finder 15 (not shown), as well as closing a circuit for operating toll line relay TL which extends from (+), make contact of relay LR, lower winding of relay TL, conductor 24, make contact of relay 3BV and resistor to (—). Relay TL closes a locking circuit for itself by way of its upper winding which maintains this relay in its operated position until the release of the connection, this locking circuit being completed through make contacts of relays LR and CO. The circuit from (—) to conductor 24, closed by relay 3BV, is rendered effective by the operation of relay 3BV in response to the above described pulse applied to dial leg #4, this pulse extending over conductor 30 of the #2 physical circuit, break contacts of alarm relays 1A and 2A and upper winding of relay 3BV to (—). When this pulse is terminated, relay 3BV is released, thus operating relays 3BV and TL of the line circuit on a toll call for a purpose later to be explained. When the line finder 15 connects to the calling repeater 13, as above described, relay CO is operated over a circuit extending from (+), make contact of relay SA of connector 17 (this relay being operated as will be later described), sleeve conductor 3S, through the line finder and winding of relay CO to (—).

Since this energization of relay PL of repeater 13 is at a comparatively low value, because of the resistance in series with relay PL, the dial leg #1 is energized at a comparatively low value for "on hook" supervision, this because relay AB of repeater 12 does not operate to reverse the battery back to repeater 11 for repeating this supervision to the manual office.

It will now be assumed that the operator dials #2111. When connector 17 is extended to repeater 13, relay CB of the connector operates over a circuit extending from (+), upper winding of relay CB, break contact of answering bridge relay AB, break contact of link cut-off relay LCO, tip conductor 3T, through the line finder 15 to the incoming line circuit, make contact of relay 2SA, upper winding of the right-hand portion of the repeat coil, make contact of relay 2SAP, make contact of relay PL, upper winding of relay POL, make contact of relay 2SAP, lower winding of the right-hand portion of the repeat coil, make contact of relay 2SA, line finder 15, conductor 3R, break contacts of relays LCO and AB in series and lower winding of relay CB to (—). Relay CB closes a circuit for operating relay SA which extends from (+), break contact of relay LCO, make contact of relay CB and winding of relay SA to (—). Relay SA closes a circuit for operating relay CX of the counting relay group extending from (+), lower inner make contact of relay SA, break contact of counting release relay CRL, the stick 1 conductor 22, break contacts in series of counting relays C3, C2, C1 and winding of relay CX to (—).

The operator (or calling party) now receives dial tone over a circuit extending from the common dial tone conductor, make contact of relay CX, conductor DT, break contact of relay 1TF, condenser 36, break contacts in series of relays AB and LCO, conductor 3T and thence over the line circuit extending to the calling station, as above described.

These counting relays operate to record the impulses of the digits dialed into the connector, but since it is not believed necessary to show all ten counting relays, in addition to the counting relay primer CX, only three of these counting relays are illustrated in Fig. 6. The operation of a complete bank of counting relays may be understood by reference to Powell Patent #2,241,156 where the stick 1, stick 2 and pickup conductors 22, 27 and 28 correspond to similarly identified conductors in the present disclosure.

When the first digit (#2) is transmitted, the impulses from the manual office operate through repeater 11, line finder 14 and connector 16 for intermittently opening and closing conductors T and R leading to repeater 12. This results in relay CB of repeater 12 being released twice after which it remains energized. The first release of this CB relay opens up the above described #1 dial leg circuit, with relay 1SA remaining energized during impulsing. The first release of relay CB also closes a circuit for operating changeover relay 1CHO extending from (+), break contact of relay PL, break contact of relay CB, make contact of relay 1SA and winding of relay 1CHO to (—). Relay 1CHO short-circuits the winding of relay AB of repeater 12 to remove the impedance of this winding from the dial leg circuit so that the next energization of relay CB energizes the dial leg at a comparatively high current value. The second impulse (relay CB released) again opens up the dial leg and at the end of this impulse (relay CB operated) the #1 dial leg is again energized at a comparatively high current value until relay 1CHO is released, which occurs shortly after the end of the series of impulses, at which time relay AB is again inserted into the #1 dial leg.

The pulsing of the #1 dial leg effects the pulsing of relay PL of repeater 13. Each release operation of relay PL opens up the above described incoming line circuit (to which connector 17 is connected) for impulsing relay CB of the connector. The first release of relay PL closes a circuit for operating relay 2CHO which extends from (+), break contact of relay PL, break contact of relay CB, break contact of relay 1SA, make contact of relay 2SAP and winding of relay 2CHO to (−). Relay 2CHO short-circuits the upper winding of relay POL and the right-hand repeat coil windings, so that relay PL can pulse connector 17 over a circuit having no impedance connected therein.

When relay PL of repeater 13 remains energized, after the series of impulses have been transmitted, relay 2CHO is released for inserting the upper winding of relay POL and the repeat coil windings in the line circuit leading to the connector.

Referring to connector 17, the release of relay CB at the beginning of the first impulse closes a circuit for operating counting relay C1 extending from (+), break contact of relay LCO, break contact of relay CB, make contact of relay SA, break contact of relay BY, conductor 39, break contact of test relay TT, break contact of ringing relay RI, pickup conductor 28, make contact of relay CX and winding of relay C1 to (−). Relay CX is locked operated during this pulse transmission by way of the stick 2 conductor 27 to (+) by way of the other break contact of relay CB and the lower inner make contact of relay SA. At the end of the first impulse (relay CB energized) stick 2 conductor 27 is opened for releasing relay CX. This opens up the dial tone circuit. When the second impulse is transmitted, the release of relay CB again applies (+) to pick-up conductor 28 for operating counting relay C2 by way of a break contact of relay CX and a make contact of relay C1. Relay C1 is maintained energized during this pulse transmission by means of the above described circuit to the stick 2 conductor 27, now extending through a break contact of relay CX and a make contact of relay C1 to the winding of relay C1. At the end of this pulse transmission, relay CB operates and remains operated until the next digit for effecting the release of relay C1, with relay C2 being maintained in its energized position by means of (+) on the stick 1 conductor 22, by way of break contact of relay CRL and the inner lower make contact of relay SA.

At the beginning of the first impulse, relay CHO of the connector is operated, since this relay is connected to pick-up conductor 28 and at the end of the series of impulses, relay CHO is released, it being maintained operated during the transmission of impulses over the above described circuit including the break contact of relay RI, as well as by means of a locking circuit for relay CHO, this latter circuit being provided to maintain relay CHO operated when relay RI is operated during pulsing, as will be later described.

When relay CHO releases at the end of the hundreds digit transmission, the hundreds selection is executed by means of a circuit which is effective to operate the selected HC relay. In the present example, relay HC2 (Fig. 7) will be operated because it was assumed that #2 was dialed for the hundreds digit. The circuit for operating relay HC2 extends from (+), make contact of relay SA, break contact of relay CHO, executing conductor EX, break contact of transfer relay 1TF, conductor XEH, make contact of counting relay C2, conductor HC2, and winding of relay HC2 to (−). Relay HC2 closes a locking circuit for itself extending from (+), make contact of relay SA, stick conductor STK, make contact and winding of relay HC2 to (−). A circuit is now closed for operating relay CRL which extends from (+) on stick conductor STK, make contact of relay HC2, conductor HCSTK, break contact of relay 1TF and upper winding of relay CRL to (−). The operation of relay CRL closes a circuit for operating relay 1TF which may be traced from (+) on conductor HCSTK, make contact of relay CRL and winding of relay 1TF to (−). Relay 1TF completes a locking circuit for itself which is independent of the make contact on relay CRL, so that relay 1TF will remain in its operated position after relay CRL is released, the release of relay CRL being effected when relay 1TF operates and opens the break contact of the make before break combination.

The operation of relay CRL opens up the stick 1 conductor 22 for effecting the release of the counting relay left operated, in this example relay C2, and when relay CRL is released, conductor stick 1 is again connected to (+) for operating relay CX for preparing the counting relay circuits for the next digit. Transfer relay 1TF as well as transfer relays 2TF and 3TF, are slow to operate, as indicated by the heavy line section at the top of the relay coil. This is for the purpose of introducing sufficient time to release out the counting relay left operated at the end of the digit and then to operate relay CX in preparation for the next digit.

When the next (tens) digit is dialed, relay CB releases for again operating counting relay C1 and change-over relay CHO, over the previously described circuit. At the end of this impulse, relay CX is released, relay C1 remains operated and, since it is assumed that this is the end of the digit, relay CHO is released for executing the tens digit. This executing circuit extends from (+) on conductor EX (as above described), make contact of relay 1TF, break contact of relay 2TF, conductor XOT, make contact of relay C1, conductor TC1 and winding of tens connector relay TC1 to (−). Relay TC1 closes a locking circuit for itself from (+) on conductor STK, make contact and winding of relay TC1 to (−). The operation of relay TC1 (or any other TC relay, not shown) extends conductor STK to conductor TCSTK for again operating relay CRL over a circuit including the break contact of the make before break combination of relay 2TF. Relay CRL extends conductor TCSTK to the winding of relay 2TF for operating this relay, which in turn closes a locking circuit for itself by way of its make before break contact and conductor TCSTK. The operation of relay 2TF opens up and releases relay CRL. During the interval while relay CRL was operated, relay C1 is released. Relay CX is again operated when relay CRL is released for preparing the counting relay circuits for the next digit.

When the units digit is dialed (#1, in this example), relay CB is released once for operating relays C1 and CHO, as above described, after which relay CB remains operated for effecting the release of relays CX and CHO. The release of relay CHO again applies (+) to executing conductor EX for operating units connecting relay UC1 over a circuit from conductor EX, make contacts of relays 1TF and 2TF in series, break contact of relay 2TF, conductor XOU, make contact of relay C1, conductor UC1 and winding of relay UC1 to (−). Relay UC1 closes a locking circuit for itself from (+) on conductor STK and extends this STK conductor back over conductor UCSTK, make contact of relay 2TF, break contact of relay 3TF and upper winding of relay CRL to (−) for operating this latter relay. Relay CRL extends conductor UCSTK by way of make contacts of relays 2TF, CRL, and 2TF to the winding of relay 3TF for operating this latter relay, which relay closes a locking circuit for itself by way of its make before break contact.

Relay 3TF opens up and releases relay CRL and during the interval when relay CRL is operated, counting relay C1 is released and when relay CRL is released, relay CX is again operated to prepare the counting relay circuits for the station digit.

Assuming that the called line is idle the operation of relay 3TF extends the sleeve conductor 35 of the called line by way of make contacts in series of relays TC1 and UC1, sleeve conductor 4S, make contact of relay 3TF, break contacts in series of relays BY and 4BV and make contact of relay SA to (+). This circuit to (+) makes the called line busy and operates its cut-off relay for removing the battery connection from the called line circuit.

In the event that the called line is busy, the connection of sleeve conductor 35 by way of conductor 4S, break contact of relay 3TF, make contact of relay 2TF and lower winding of relay BY to (−) operates relay BY before slow operating relay 3TF has time to operate after relay UC1 connects the sleeve conductor of the called line to the winding of busy relay BY. The operation of relay BY closes a locking circuit for itself by way of its lower winding and its make before break contact to (+) by way of a break contact of relay 4BV and a make contact of relay SA. Relay BY opens up the winding of relay TT to prevent the operation of this relay on a call to a busy line. When the station digit is dialed relay CB applies a momentary (+) impulse by way of its break contact, make contact of relay SA, make contact of relay BY, conductor 43, break contact of relay TL (assuming for the present that this is a call from a local line and not a toll line, in which case relay TL will be de-energized), conductor 49, make contact of relay 3TF, conductor 48, winding of ringing relay RI and resistor to (−). Relay RI operates and closes a locking circuit for itself extending from (+) on conductor STK, make contact and winding of relay RI and resistor to (−). It will be noted that relay RI is operated over the above described circuit at the beginning of the impulse transmission, but since the pick-up conductor 28 is open at a back contact of relay RI, relay CHO is not operated and none of the counting relays are operated in response to the station digit pulses on a call to a busy line from a local line. The calling party now receives the busy tone over a circuit extending through a break contact of relay 4BV, make contact of relay BY, conductor BT, make contact of relay RI, conductor 38 and small tone condenser 36 to the calling line. In a call to a busy line, sleeve conductor 4S is maintained open after relay 3TF is operated, since relay 4BV is not operated and relay BY is operated, this for maintaining the sleeve conductor of the called line clear until the calling party hangs up and another attempt is made to connect with the called line.

Returning now to the part of the description where the called line was found to be idle, the station digit is effective to release relay CB, after which this relay remains operated. The release of relay CB closes a circuit for operating relays C1 and CHO by way of pick-up conductor 28, as previously described. At the termination of this impulse, relays CX and CHO are released, the latter relay closing the executing circuit from (+) on conductor EX, make contacts of relays 1TF, 2TF and 3TF in series, conductor 53, make contact of relay RI, conductor 47, break contact of relay BY, conductor 46 and winding of relay TT to (−). The reason that relay RI is operated at this time is that its circuit is completed at the beginning of the station digit impulse transmission by way of a make contact of relay CHO, make contact of relay 3TF, conductor 48 and winding of relay RI. Relay RI closes the above described locking circuit for itself. When relay TT is operated at the end of the impulse transmission for the station digit, as above described, it closes a locking circuit for itself from (+) on conductor EX, make contacts in series of relays 1TF, 2TF and 3TF, conductor 53, make contact of relay TT, conductor 47, break contact of relay BY, conductor 46 and winding of relay TT to (−), this locking circuit being independent of its operating circuit through the make contact of relay RI for maintaining relay TT operated after relay RI is released, as will now be described.

With relays RI and TT operated, pick-up conductor PK is extended to the winding of cut-in relay CI for operating this relay at the beginning of a ringing code transmission, as is well understood in the art. The operation of relay CI closes a locking circuit for itself including hold conductor HD for maintaining this relay operated throughout the code transmission, as is well understood in the art. 33-cycle ringing current is now applied to the called line over a circuit extending from the 33-cycle source, make contact of relay C1, make contact of relay CI, winding of trip relay TR, conductor 37, make contact of relay HC2, conductor 34, make contacts in series of relays RI and TT, conductor 4R, make contacts of relays UC1 and TC1, called line and instrument circuits, make contacts in series of relays TC1 and UC1, conductor 4T, make contacts in series of relays TT and RI, conductor 33 and make contact of relay HC2 to the generator ground or return circuit for the source of ringing current. It will be noted that relay HC2 reverses the ringing circuit, including conductors 33 and 34, extending to the called line, thus if #3 was the first digit dialed, then relay HC2 would not be operated and the ringing current would be applied to the called line in reverse order from that above described, thus providing for divided ringing.

When the called party answers, trip relay TR operates for short-circuiting and releasing relay RI, after which the circuit to the generator source, including relay TR, is opened for releasing this latter relay. Relay RI, in releasing, extends the called line to the windings of relay AB by way of conductors 51 and 52, this latter relay being operated to reverse the current back towards the calling station. Hold conductor HD is deenergized at the end of the code ringing cycle for releasing relay CI and the release of relay RI opens up the circuit to pick-up conductor PK so that relay CI remains de-energized throughout the remainder of the connection. Talking battery is fed to the called station through the windings of relay AB, to the calling station through the windings of relay CB, with these two stations being connected for conversation through the talking condensers and break contacts of relay 4BV.

When the called party hangs up, relay AB releases to straighten out the battery connection for giving supervision in a manner to be later described. When the calling party hangs up, relay CB releases for effecting the release of relay SA, after which (+) is removed from the various conductors which maintain relays HC2, 1TF, TC1, 2TF, UC1, 3TF, called line cut-off relay, and TT operated, thus effecting the release of these relays and restoring the circuits to normal. The release of relay SA also removes (+) from stick conductor 1STK extending back to line finder 15 for releasing the line finder circuit (not shown) in a manner which is well understood in the art. Relay SA also removes (+) from conductor 3S extending back through the line finder for releasing the cut-off relay of the line circuit and this relay in turn opens up and releases relay TL, thus restoring the line circuit to normal.

It is believed that the above example explains how the circuits function in response to the dialing of the four digits for selectively ringing the called station and for providing the various circuit operations usually found in local and trunk calls. It will now be explained how the repeaters in exchanges A and B function to provide supervision, it already having been explained how the impulshing circuits of the repeaters function. It will also be explained how the alarm and busy verification circuits operate, keeping in mind the previous circuit description.

Since, in the above explanation, it was assumed that the call came over the trunk from exchange A to exchange B and connector 17 was used, it will be obvious that there would be no reason for dialing #1 for the first digit on the connector because this selects the level leading to trunks back to exchange A. However, when the call is initiated in exchange A and connector 17 is used, this connector will function for selecting local lines in the manner previously described. If #1 is the first digit on a local call, then when this digit is executed and (+) is applied to conductor XOH, the circuit is extended through a make contact of counting relay C1, the dotted connection, conductor HC1, leading to the winding of relay HC1 for operating this relay. At this point it will be pointed out that connector 16 in exchange A extends this first digit executing circuit by way of pulse absorbing conductor PA to the lower winding of relay CRL for operating this relay and since no HC relay is operated, relay 1TF is not operated, thus effecting the release of counting relay C1, after which relay CRL is released for again operating relay CX to prepare the circuits for receiving the next digit. In other words, when the connector operates on a "drop back" basis for digit #1 (which is the case for connector 16) the first digit #1 will be cancelled for absorbing digits 1 and 1 to allow the connector to then select level 0 in response to dialing 110 for a call from exchange A to the manual exchange. Since connector 17 in exchange B holds on level 1 for the first digit and connector 16 in exchange A drops back from level 1 for the first digit, level 0 is also selected by connector 16 for selecting a trunk to the manual exchange on a call from a local subscriber in exchange B.

Referring back to the operation of relay HC1, on a call from a local station in exchange B, this relay closes a circuit from (+), break contact of relay LCO, break contact of relay BY, link release conductor LORL, make contact of relay HC1, winding of marker relay 1L01, break contact of relay 1L01, break contact of common lock-out relay CLO and resistor to (—). The operation of relay 1L01 closes a locking circuit for itself including the winding of relay CLO which is effective to operate relay CLO and disconnect (—) from the windings of all marker relays to prevent the operation of more than one of these relays in a given group at any one time.

Relay 1L01 closes a circuit for operating allotter relay 1ALG extending from (+), make contact of relay 1L01, break contact of guard relay GD, break contact of allotter relay 1AL and winding of relay 1ALG to (—). The operation of relay 1ALG closes and obvious circuit for operating relay GD which transfers the 1ALG relay circuit from its operating to its locking circuit including make contact of relay GD, break contact of relay 1AL, make contact and winding of relay 1ALG to (—).

There is a pair of allotter relays 1AL and 1ALG for each trunk circuit, only one of these being shown. Since it is assumed that trunk #1 is idle, the operation of relay 1ALG as a result of trunk #1 being marked, completes a circuit for operating units connector relay UC1 extending from (+), make contact of relay 1L01, make contact of relay 1ALG and winding of relay UC1 to (—). Relay UC1 closes a locking circuit for itself extending from (+), make contact of relay SA, conductor STK, make contact and winding of relay UC1 to (—). Since relay UC1 is operated and relay 2TF is not operated, (+) on conductor STK is extended by way of conductor UCSTK, break contact of relay 2TF and winding of relay LCO to (—). Relay LCO operates and, at its make before break contacts extends the calling line by way of conductors 3T and 3R to conductors 4T and 4R, make contacts of relay UC1, make contacts of relay HC1, conductors 1T and 1R, right-hand windings of the repeat coil associated with repeater 13, break contacts in series of relays 2SAP and AB to (+) and (—) through the windings of relay CB for operating this latter relay.

The operation of relay LCO of the connector opens up and releases relay CB which in turn opens up and releases relay SA. Before relay SA of the connector releases, (+) is extended back from repeater 13 by way of conductor 1S and make contacts of relays HC1 and UC1, conductor 4S, make contacts and winding of relay LCO to (—) for locking this latter relay under the control of relay 1SA of repeater 13, this latter relay being operated when relay CB of this repeater operates.

Relay LCO of the connector maintains (+) on conductor 1STK for holding line finder 15 in connection with the calling line, it extends (+) on conductor 4S back over conductor 3S for maintaining the cut-off relay of the calling line operated and it applies (+) to allotter conductor 3AL, to replace the (+) which relay SA of the connector applied to conductor 3AL for marking this connector in the allotter circuit as being in use. The line finder and associated allotter circuits have not been shown, since the line, marker, lock-out, allotter and finder circuits may be the same as shown in Figs. 2 to 4, inclusive of Powell Patent 2,325,877.

It will now be explained how the connector circuit functions to provide the delayed ring feature on a toll call, such as a call from the manual exchange to a subscriber in automatic exchange B, illustrated in Fig. 1B. Recalling that the incoming line circuit illustrated in the right-hand portion of Fig. 4 is used on a toll call and that relay TL of this line circuit has been operated and locked, when relay CX of Fig. 6 is operated when the connector is first seized, toll line relay TL of Fig. 6 is operated over a circuit extending from (+), make contact of relay TL of Fig. 4, conductor 3TL, through the line finder 15, conductor 3TL, make contact of relay CX and winding of relay TL to (−). At the end of the transmission of the first impulse of the first digit, relay CX releases, as above described, to open up and release relay TL. Relay TL is again operated before the second digit is dialed and is released after the first impulse of this digit, by the release of relay CX. Relay TL again operates and releases before and after the third digit is transmitted in the same manner as described for other digits. When relay CX operates to close the circuit for operating relay TL before the station digit is transmitted, a circuit is closed for operating test relay TT of the connector which extends from (+), make contact of relay SA, break contact of relay CHO, executing conductor EX, make contacts in series of relays 1TF, 2TF and 3TF, conductor 53, make contact of relay TL, conductor 47, break contact of relay BY, conductor 46 and winding of relay TT to (−). Relay TT closes the above described locking circuit for itself, thus being operated before relay RI is operated as was the case in connection with a local call previously described. With relay TT operated the ringing or station digit of the called party may be held off while the toll operator is working on the connection, thus it only being necessary for the operator to dial the last or station digit when ready to ring the called party. If a party on the called line should remove the receiver while the operator is working on the connection, the closed circuit across this line is extended by way of conductors 4T and 4R, make contacts of relay TT, break contacts of relay RI, conductors 51 and 52 and windings of relay AB to (+) and (−), thus operating this relay and reversing the battery connection back to the repeater for passing supervision back to the operator as an indication that someone is trying to use the line she is holding.

In the event that this supervision is not effected by a station on the called line before the operator is ready to signal the called station, the impulse or impulses transmitted to select this station effect the operation of relay CB for closing a circuit at the first release operation of relay CB for operating relay RI. This circuit extends from (+), make contact of relay SA, make contact of relay CHO, make contact of relay 3TF, conductor 48, winding of relay RI and resistor to (−). Relay RI closes the above described locking circuit for itself and, with relays RI and TT both operated, relay CI again operates to extend the ringing circuit to the called line. The circuits now function in the previously described manner for tripping the ring and for operating relay AB, with the release operation being effective to release out all operated relays in the previously described manner. It will be obvious that relay TT cannot be operated on a delayed ring toll call when the called line is busy because its winding is opened by the operation of busy relay BY.

In this event, it is necessary for the toll operator to make the busy verification test as will be later described.

Referring again to the operation on a call from the manual office to a station in automatic exchange B, when relay AB of the connector reverses the battery, polar relay POL of repeater 13 is operated for short-circuiting the resistance in series with relay PL. This increases the current flow in dial leg #1 to a comparatively high value for operating relay AB of repeater 12. Relay AB reverses the battery back to conductors T and R leading through connector 16 and line finder 14 to repeater 11 for operating a polar relay in this latter repeater in the same manner that relay POL of repeater 13 is operated. The polar relay in repeater 11 then increases the current flow in the dial leg leading to the manual office for operating an AB relay in this repeater or functions in any other desired manner for passing this supervisory condition back to the manual cord circuit.

When the called party hangs up, relay AB of the connector releases and straightens out the battery connection to repeater 13 for releasing relay POL, which again inserts the resistance in series with relay PL and dial leg #1 for releasing relay AB, this latter relay straightening out the battery connection back to repeater 11, etc.

When the operator releases the connection, relay CB of repeater 12 in automatic exchange A is released for effecting the release of relay 1SA. The release of relay CB opens up dial leg #1 for de-energizing this conductor leading to exchange B. This effects the release of relay PL of repeater 13, which in turn releases relays 2SA and 2SAP. The release of relay PL also opens up the right-hand portion of the repeat coil circuit of repeater 13 for opening up the incoming line circuit and releasing the connection in exchange B. The release of relays CB of repeater 12 and repeater 13 close momentary circuits for operating the 1CHO relays of these repeaters and when the 1SA relays of these repeaters release, the circuit for the CHO relays are opened and these relays release. These CHO relays perform no function at this time. The release of relay 1SA of repeater 12 again closes the circuit for again operating relay 1SAP thus restoring the repeater circuits to normal. Referring to Figs. 2A, 2B, 3 and 4, it will now be explained how the alarm signal is transmitted from either automatic office to the manual office. It is customary to provide two alarm relays, such as 1A and 2A in these automatic exchanges for operating in response to minor and major alarms. It is not believed necessary to show just how these 1A and 2A relays are operated, since it is well known to those skilled in the art how such relays may be energized in response to the blowing of a fuse, the failure of an important circuit and the like, which requires the attention of an attendant. The energization of either relay 1A or 2A in automatic exchange A disconnects dial leg #4 from the upper winding of relay 2BV and connects this dial leg to the lower winding of relay 2BV. This de-energizes the normally energized #4 dial leg for effecting the release of alarm relay 1AM in the manual exchange. This in turn effects the release of repeater relay 1AMP for operating slow operate relay SO and this latter relay closes a locking circuit for itself and also closes an obvious circuit for lighting the alarm lamp. This gives the operator in the manual exchange a visual indication that a case of trouble exists in either automatic exchange A or automatic exchange B and she can dial up special numbers in these offices to determine the location and the type of the trouble which exists. This dialing up circuit is not shown, since it forms no part of the present invention. When proper attention has been given to the signal, the release key may be momentarily operated for releasing relay SO, relays 1AM and 1AMP being restored to their normally energized conditions when the dial leg #4 is re-energized in response to the clearing of the trouble.

In the event of an alarm condition in automatic exchange B, the operation of the 1A or 2A relays de-energizes the normally energized dial leg #4 extending to automatic exchange A for releasing high resistance alarm relay 2AM. Relay 2AM effects the release of relay 2AMP unless this latter relay is locked due to the operation of the busy verification feature, under which condition relay 2AMP is not released until after the busy verification momentary test is effected. The release of relay 2AMP in automatic exchange A de-energizes dial leg #4 extending to the manual exchange for bringing in the alarm lamp in the previously described manner. When the trouble condition is cleared up, dial leg #4 is again energized for operating relay 2AM, which in turn operates relay 2AMP for in turn re-energizing dial leg #4 for again operating relays 1AM and 1AMP, thus restoring the circuits to normal.

It will now be explained how the busy verification feature operates. From the above explanation, it will be seen that relay TL of the connector link is not operated when local calls are made through the connector. It will be assumed that a call is set up from the manual exchange to a local subscriber in automatic exchange A. Since the trunk between the manual exchange and automatic exchange A extends through repeater 11 and terminates on its own line circuit, the call to the connector may be marked as coming from a toll line by simply extending (+) by way of a conductor corresponding to 3LT of Fig. 5 to connector 16. With (+) on this conductor, relay TL will be operated in the previously described manner to mark this as a toll call. Since relay TL controls the busy verification feature and since this feature will be explained in connection with connector 17 in automatic exchange B, this feature need not be explained in connection with connector 16 because it operates in exactly the same manner in exchange A as it does in exchange B. The only difference in the operation between a toll connection from the manual exchange to a local station in exchange A and a toll connection from the manual exchange to a local station in exchange B is that such a toll connection extending a call to the local station in exchange A is readily identified as above explained, while a toll connection through exchange A to exchange B makes use of the same interoffice trunks between exchange A and exchange B as used by local subscribers in exchange A. Consequently, it is necessary to distinguish in the connector link in exchange B between a call from a subscriber in exchange A and a call from the toll operator in the manual exchange.

When the toll operator plugs into the trunk jack, the line finder 14 extends the connection to connector 16 and the operator dials #8 for selecting a trunk to exchange B. Since connector 16 switches through on lever 8 (in a manner similar to the switching through function on level 1 for connector 17, above described), the dial impulses are received by relay CB in repeater 12 (Fig. 3) connected to the interoffice trunk leading to repeater 13. Relay CB of repeater 12 repeats these impulses over dial leg #1 between exchanges A and B for operating relay PL of repeater 13 in exchange B, this latter relay again repeating these impulses to relay CB of the selected connector 17 in exchange B. It has been explained how the #4 dial leg of the composite set between the manual exchange and exchange A is normally energized for maintaining relay 1AM in the manual exchange operated as long as there is no alarm condition set up for opening this dial leg. This normally energized circuit is also dependent on the energization of the #4 dial leg of the composite set between exchange A and exchange B. It will be understood that the opening of this #4 dial leg between exchange A and the manual exchange because of an alarm condition in exchange A or because the #4 dial leg between exchange A and exchange B is opened by an alarm condition in exchange B, de-energizes relays 1AM and 1AMP in the manual exchange for bringing in the alarm circuit in the previously described manner.

When the manual exchange operator selects a trunk leading to exchange B by dialing #8, the CX repeater 12 is selected. This selection effects the operation of relays CB and 1SA and the release of relay 1SAP of repeater 12. During the interval between the operation of relay 1SA and the release of relay 1SAP, a connection is extended from (—) through the resistance associated with repeater 11, through line finder 14 and connector 16, conductor TL, make contact of relay 1SAP, make contact of relay 1SA, conductor 21 and lower winding of relay 2BV to (+). This operates relay 2BV, it being understood that this operation is not effected on a call from a local line in exchange A because this line does not carry the circuit from (—) through to conductor TL of repeater 12.

The operation of relay 2BV disconnects the #4 dial leg between exchange A and exchange B from the high resistance relay 2AM and connects it to direct (+) at a make contact of normally energized relay 2AMP. This connection to direct (+) operates relay 3BV in exchange B over dial leg #4 between exchanges A and B by way of the upper winding of relay 3BV to (—). Since this is only a momentary pulse on dial leg #4, relay 3BV will only be operated momentarily. At the same time that relays CB and 1SA of repeater 12 in exchange A are operated, the #1 dial leg is energized for operating relays PL, 2SA and 2SAP of repeater 13 in exchange B, all in the previously described manner. This effects the operation of line relay LR of the incoming line circuit in exchange B for marking this line as the one to be found by line finder 15 and extends the connection to connector 17.

With line relay LR of the incoming line circuit operated at the same time that relay 3BV is operated, a circuit is closed for operating relay TL of this incoming line circuit which may be traced from (+), make contact of relay LR, lower winding of relay TL, conductor 24, make contact of relay 3BV and resistor to (—). Relay TL locks itself operated as long as the incoming line circuit is in use, in the previously described manner. It will be understood that a call from a local line in exchange A will not operate relay 3BV, consequently relay TL of the incoming line circuit in exchange B will not be operated on such a call even though line relay LR is operated the same as if this was a toll call. Relay TL, in its operated position, marks this incoming line circuit as one coming from the manual toll board by extending (+) over conductor 3TL to connector 17.

Referring now to connector 17, when the toll operator dials a busy line, relay BY is operated and locked, in the previously described manner. When relay 3TF operates for releasing relay CRL and again operating relay CX at the end of the units digit, relay TL is operated to (+) on conductor 3TL. With relays BY and TL operated, busy tone is connected to the line circuit incoming to connector 17 and is heard by the toll operator. With relays TL and BY operated, the operation of the dial effects the intermittent operation of relay CB, but no other relays of the connector link are operated in response to these dial impulses.

When the toll operator desires to cut in on the busy connection and offer the toll call, she operates the busy verification key BV and dials #1. The operation of key BV operates relay 1BV, since a connection to (+) is applied to key BV when any sleeve relay SL is operated. The operation of relay 1BV switches dial leg #4 from high resistance relay 1AM to direct (+) for energizing this dial leg extending to exchange A, which operates relay 2BV by way of its upper winding. Relay 2BV in turn switches dial leg #4 extending to exchange B from high resistance relay 2AM to direct (+) for operating relay 3BV in exchange B. Now when the one impulse is transmitted by the dial, the release of relay CB of the connector link happens at the same time that relay 3BV is operated, therefore a circuit is closed from (+), break contact of relay LCO of the connector, break contact of relay CB, make contact of relay SA, make contact of relay BY, conductor 43, make contact of relay TL, conductor 44, upper winding of relay 4BV, conductor 25, make contact of relay 3BV and resistor to (—). This operates relay 4BV and this relay in turn closes a locking circuit for itself extending from (+), break contact of relay LCO, make contact of relay BY, make contact and lower winding of relay 4BV to (—). The toll operator is now connected to the busy called connection by way of the talking condensers of the connector, make contacts of relay 4BV, conductors 4T and 4R and make contacts of relays UC1 and TC1, for example, to the called line. The toll operator may offer the call to the wanted party and if this party desires to accept the toll call the receivers on the busy connection are hung up for effecting the release of this connection, in the previously described manner. The release of the connection removes (+) from the called sleeve 4S of the connector used by the toll operator and this is effective to release relay BY, since the operation of relay 4BV switched the locking circuit for relay BY from (+) controlled by relay SA to (+) on the called sleeve conductor.

The release of relay BY opens up the locking circuit of relay 4BV for effecting the release of this latter relay. With relays BY and 4BV released, (+) is applied to the sleeve of the called line (4S) for making this line busy and for operating the cut-off relay of this line. This circuit extends from (+), make contact of relay SA, break contacts of the make before break combinations of relays 4BV and BY and make contact of relay 3TF to conductor 4S. This places the circuits of the connector link in condition for responding to the station digit, which is now dialed by the operator, or delayed, for operating the circuits just the same as when the station digit is dialed on a call to an idle line.

Notice is hereby given that subject matter disclosed herein is claimed in my copending application Serial No. 135,919, filed December 30, 1949, as a division of this application and assigned to the same assignee as the present application.

What I claim is:

1. In a telephone system, a first unattended dial office, a second unattended dial office, an attended office, alarm sending apparatus in each of said dial offices responsive to trouble conditions in the associated office, a first signal receiving means in said attended office, a second signal receiving means in said first dial office, a first two-wire physical trunk circuit interconnecting said first dial office and said attended office, a second two-wire physical trunk circuit interconnecting said second dial office and said first dial office, means including one leg of said first physical trunk circuit for dialing up connections from said attended office to said first dial office, means including one leg of said second physical trunk circuit for dialing up connections from said first dial office to said second dial office, means including the alarm sending apparatus in said first dial office for transmitting a distinctive alarm signal to said first signal receiving means over another leg of said first physical trunk circuit, and means including the alarm sending apparatus in said second dial office for transmitting a distinctive alarm signal to said second signal receiving means over another leg of said second physical trunk circuit.

2. In a telephone system, a first unattended dial office, a second unattended dial office, an attended office, alarm sending apparatus in each of said dial offices responsive to trouble conditions in the associated office, a first signal receiving means in said attended office, a second signal receiving means in said first dial office, a first two-wire physical trunk circuit interconnecting said first dial office and said attended office, a second two-wire physical trunk circuit interconnecting said second dial office and said first dial office, means including one leg of said first physical trunk circuit for dialing up connections from said attended office to said first dial office, means including one leg of said second physical trunk circuit for dialing up connections from said first dial office or from said attended office to said second dial office, means including the alarm sending apparatus in said first dial office for transmitting a distinctive alarm signal to said first signal receiving means over another leg of said first physical trunk circuit, means including the alarm sending apparatus in said second dial office for transmitting a distinctive alarm signal to said second signal receiving means over another leg of said second physical trunk circuit, and means for re-transmitting said last mentioned alarm signal to said first signal receiving means over said other leg of said first physical trunk circuit.

3. In a telephone system, three exchanges connected in tandem by trunk lines, means for transmitting station selecting pulses over a first trunk line from one end exchange to the intervening exchange, means responsive to said station selecting pulses for repeating a replica thereof over a second trunk line from the intervening exchange to the other end exchange, means for transmitting a busy verification pulse over a third trunk line from said one end exchange to the intervening exchange, means responsive to said busy verification pulse for repeating a replica thereof over a fourth trunk line from the intervening exchange to said other end exchange, means controlled by the concurrent reception of a replica of one of said station selecting pulses and said replica of the busy verification pulse for effecting a talking connection from the transmitting station in said one end exchange to a busy called line in said other end exchange, and means for transmitting an alarm signal over said third trunk line from said intervening exchange to said one end exchange.

4. In a telephone system, three exchanges connected in tandem by trunk lines, means for transmitting station selecting pulses over a first trunk line from one end exchange to the intervening exchange, means responsive to said station selecting pulses for repeating a replica thereof over a second trunk line from the intervening exchange to the other end exchange, means for transmitting a busy verification pulse over a third trunk line from said one end exchange to the intervening exchange, means responsive to said busy verification pulse for repeating a replica thereof over a fourth trunk line from the intervening exchange to said other end exchange, means controlled in response to the concurrent reception of a replica of one of said station selecting pulses and said replica of the busy verification pulse for establishing a talking connection from the transmitting station in said one end exchange to a busy called line in said other end exchange, and means for transmitting an alarm signal over said fourth trunk line from said other end exchange to said intervening exchange.

5. In a telephone system, three exchanges connected in tandem by trunk lines, means for transmitting station selecting pulses over a first trunk line from one end exchange to the intervening exchange, means responsive to said station selecting pulses for repeating a replica thereof over a second trunk line from the intervening exchange to the other end exchange, means for transmitting a busy verification pulse over a third trunk line from said one end exchange to the intervening exchange, means responsive to said busy verification pulse for repeating a replica thereof over a fourth trunk line from the intervening exchange to said other end exchange, means controlled in response to the concurrent reception of a replica of one of said station selecting pulses and said replica of the busy verification pulse for establishing a talking connection from the transmitting station in said one end exchange to a busy called line in said other end exchange, and means for transmitting an alarm signal over said third and said fourth trunk lines from said other end exchange to said one end exchange.

WINFRED T. POWELL.

REFERENCES CITED

The following references are of record in the file of this patent:

UNITED STATES PATENTS

| Number | Name | Date |
|---|---|---|
| 1,569,678 | Powell | Jan. 12, 1926 |
| 1,678,503 | Friendly | July 24, 1928 |
| 1,747,478 | Lomax | Feb. 18, 1930 |
| 1,897,048 | Hatton | Feb. 14, 1933 |
| 1,897,069 | Newsom | Feb. 14, 1933 |
| 1,899,112 | Saunders et al. | Feb. 28, 1933 |
| 1,912,450 | Hatton et al. | June 6, 1933 |
| 2,233,282 | Buchanan | Feb. 25, 1941 |
| 2,239,825 | Lomax | Apr. 29, 1941 |
| 2,244,596 | Anderson | June 3, 1941 |
| 2,278,172 | Dimond | Mar. 31, 1942 |
| 2,320,885 | Powell | June 1, 1943 |
| 2,332,290 | Baumfalk | Oct. 19, 1943 |
| 2,339,669 | Baumfalk | Jan. 18, 1944 |
| 2,365,996 | Bakker | Dec. 26, 1944 |
| 2,377,453 | Rhoads | June 5, 1945 |

Certificate of Correction

Patent No. 2,516,645

July 25, 1950

WINFRED T. POWELL

It is hereby certified that error appears in the printed specification of the above numbered patent requiring correction as follows:

Column 17, line 50, for "3LT" read *3TL*;

and that the said Letters Patent should be read as corrected above, so that the same may conform to the record of the case in the Patent Office.

Signed and sealed this 7th day of August, A. D. 1951.

[SEAL]

THOMAS F. MURPHY,
*Assistant Commissioner of Patents.*